United States Patent
Khader et al.

(10) Patent No.: US 10,764,619 B2
(45) Date of Patent: *Sep. 1, 2020

(54) METHOD AND SYSTEM FOR PROVIDING SOCIAL MEDIA CONTENT SYNCHRONIZED TO MEDIA PRESENTATION

(71) Applicant: ESW Holdings, Inc., Austin, TX (US)

(72) Inventors: Aslam Khader, Beaverton, OR (US); Larry Alan Westerman, Portland, OR (US)

(73) Assignee: ESW Holdings, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,812

(22) Filed: Dec. 7, 2015

(65) Prior Publication Data
US 2016/0088324 A1 Mar. 24, 2016

Related U.S. Application Data

(63) Continuation of application No. 13/679,491, filed on Nov. 16, 2012, now Pat. No. 9,215,503.

(51) Int. Cl.
| | |
|---|---|
| *H04N 21/242* | (2011.01) |
| *H04N 21/2665* | (2011.01) |
| *H04N 21/43* | (2011.01) |
| *H04N 21/45* | (2011.01) |
| *H04N 21/4788* | (2011.01) |
| *H04N 21/472* | (2011.01) |
| *H04N 21/432* | (2011.01) |

(Continued)

(52) U.S. Cl.
CPC ....... *H04N 21/242* (2013.01); *H04N 21/2665* (2013.01); *H04N 21/4302* (2013.01); *H04N 21/433* (2013.01); *H04N 21/435* (2013.01); *H04N 21/4307* (2013.01); *H04N 21/4325* (2013.01); *H04N 21/4524* (2013.01); *H04N 21/4532* (2013.01); *H04N 21/4622* (2013.01); *H04N 21/4788* (2013.01); *H04N 21/47202* (2013.01); *H04N 21/84* (2013.01); *H04N 21/8547* (2013.01); *H04N 21/231* (2013.01); *H04N 21/235* (2013.01); *H04N 21/25891* (2013.01); *H04N 21/6125* (2013.01); *H04N 21/6175* (2013.01); *H04N 21/6582* (2013.01); *H04N 21/6587* (2013.01)

(58) Field of Classification Search
CPC ............. H04N 21/242; H04N 21/4788; H04N 21/472; H04N 21/43; H04N 21/2665; H04N 21/45
USPC ....................................................... 386/324
See application file for complete search history.

(56) References Cited

U.S. PATENT DOCUMENTS

| | | | |
|---|---|---|---|
| 2007/0154190 A1* | 7/2007 | Gilley ................. | G11B 27/034 386/241 |
| 2011/0126226 A1* | 5/2011 | Makhlouf .......... | H04N 7/17336 725/32 |

(Continued)

OTHER PUBLICATIONS

Amendment After Notice of Allowance, dated Oct. 29 2015, U.S. Appl. No. 13/679,491, pp. 1-8.

(Continued)

*Primary Examiner* — Thai Q Tran
*Assistant Examiner* — Nienru Yang

(57) ABSTRACT

A computer system provides a method for distribution of a video stream together with associated media content.

16 Claims, 6 Drawing Sheets

(51) Int. Cl.
  *H04N 21/433*  (2011.01)
  *H04N 21/435*  (2011.01)
  *H04N 21/84*  (2011.01)
  *H04N 21/8547*  (2011.01)
  *H04N 21/462*  (2011.01)
  H04N 21/231  (2011.01)
  H04N 21/235  (2011.01)
  H04N 21/258  (2011.01)
  H04N 21/61  (2011.01)
  H04N 21/658  (2011.01)
  H04N 21/6587  (2011.01)

(56) References Cited

U.S. PATENT DOCUMENTS

| | | | | |
|---|---|---|---|---|
| 2012/0079517 | A1* | 3/2012 | Yarvis | H04H 60/31 |
| | | | | 725/14 |
| 2012/0082427 | A1* | 4/2012 | Andres Del Valle | ............... |
| | | | | H04L 65/605 |
| | | | | 386/230 |
| 2013/0016955 | A1* | 1/2013 | Pejaver | H04L 65/4084 |
| | | | | 386/248 |

OTHER PUBLICATIONS

Notice of Allowance, dated Sep. 14, 2015, U.S. Appl. No. 13/679,491, pp. 1-24.
Response to Non-Final Office Action, dated May 15, 2015, U.S. Appl. No. 13/679,491 pp. 1-11.
Non-Final Rejection, dated Feb. 17, 2015, U.S. Appl. No. 13/679,491, pp. 1-24.

* cited by examiner

600 "user":{"statuses_count":3080,
602 "favourites_count":22,
604 "protected":false,
606 "profile_text_color":"437792",
608 "profile_image_url":"...",
610 "name":"Twitter API",
612 "profile_sidebar_fill_color":"a9d9f1",
614 "listed_count":9252,
616 "following":true,
618 "profile_background_tile":false,
620 "utc_offset":-28800,
622 "description":"The Real Twitter API. I tweet about API changes, service issues and happily answer questions about Twitter and our API. Don't get an answer? It's on my website.",
624 "location":"San Francisco, CA",
626 "contributors_enabled":true,
628 "verified":true, "profile_link_color":"0094C2",
630 "followers_count":665829,
632 "url":"http:\/\/dev.twitter.com",
634 "default_profile":false,
636 "profile_sidebar_border_color":"0094C2",
638 "screen_name":"twitterapi",
640 "default_profile_image":false,
642 "notifications":false,
644 "display_url":null,
646 "show_all_inline_media":false,
648 "geo_enabled":true,
650 "profile_use_background_image":true,
652 "friends_count":32,
654 "id_str":"6253282",
656 "entities":{"hashtags":[],
658 "urls":[], "user_mentions":[]},
660 "expanded_url":null,
662 "is_translator":false,
664 "lang":"en",
666 "time_zone":"Pacific Time (US & Canada)",
668 "created_at":"Wed May 23 06:01:13 +0000 2007",
670 "profile_background_color":"e8f2f7",
672 "id":6253282, "follow_request_sent":false,
674 "profile_background_image_url_https":"...",
676 "profile_background_image_url":"...",
678 "profile_image_url_https":"..."}

FIG. 6

METHOD AND SYSTEM FOR PROVIDING SOCIAL MEDIA CONTENT SYNCHRONIZED TO MEDIA PRESENTATION

CROSS REFERENCE TO RELATED APPLICATIONS

This application is a continuation application of U.S. patent application Ser. No. 13/679,491, entitled "Method and System for Providing Social Media Content Synchronized to Media Presentation," filed on Nov. 16, 2012, invented by Aslam Khader and Larry Alan Westerman, said application, U.S. patent application Ser. No. 13/679,491, is hereby incorporated by reference herein, in its entirety.

FIELD OF THE INVENTION

This invention relates generally to providing social media content to consumers of audio-visual media content, and more specifically to methods and systems that filter and synchronize social media content during presentation of audio-visual media content.

BACKGROUND OF THE INVENTION

Since the earliest days of mass media, enthusiasts have developed means and methods for sharing their enthusiasm with like-minded individuals. Fan clubs, social gatherings, conventions, and public relations events have all served to enhance the enjoyment of mass media for those individuals with high interest.

The advent of computer-mediated communication has provided new opportunities for fan involvement. In the earliest days of computer networking, user-generated sites such as Usenet allowed devotees to share comments, insights and criticisms of popular media content. This trend has continued—contemporary media producers often develop on-line fan sites that provide additional content, background material, and related information, as well as present a forum for enthusiasts to share comments and questions.

Among fans of serial content such as television dramas, one strong preference is the avoidance of any material which might prematurely reveal plot details of unseen content. Due to the availability of recording means, some fans may view serialized content at a delay from the original presentation of the content. Most fans of continuing dramas prefer to experience the material naïve of the upcoming content, thereby maximizing the anticipatory and revelatory aspects of the experience. Accordingly, such fans seek to avoid exposure to any ancillary content created by an experienced viewer that might reveal plot details prior to viewing. Systems that assist such fans have been described in the patent literature. For example, U.S. Patent Application 2007/0157249 describes a system and method for monitoring a user's viewing progress of media in a series, then filtering peripheral media content to be consistent with the user's viewing progress in the series. Similarly, U.S. Patent Application 2012/0079517 describes a system and method for modifying a service transaction according to the viewership status of a user relative to a series of episodes. The modification may include withholding content, such as posts by other viewers, related to episodes of the series which the user has not yet viewed.

User-generated content is one form of metadata about media content. Other forms of metadata may be provided by the original content producer. Such revelatory content may bear or be assigned a temporal relationship to the media content. For example, a viewer comment about a scene in an episode is most relevant when presented in synchrony with the scene. Various systems have been described that deal with the synchronization of metadata with media content. For example, U.S. Patent Application 2009/0208180 describes a method for controlling the revelation of metadata items based on the viewing timeline of the primary media content. U.S. Patent Application 2012/0082427 describes a method of receiving secondary media content such as user-generated content, assigning a time stamp to the secondary media content relative to the primary media content, then allowing for delayed playback of the primary and secondary media content streams based upon the time stamp.

With the advent of interactive social media sites such as Facebook and Twitter, the consumption of audio-visual media content such as broadcast television has acquired a novel social dimension. Viewers of a television presentation may generate comments about the content in real time. These comments are then presented to other viewers of the same content, thereby enhancing their experience of the program content. Such comments may provide opinions about the content, secondary information about the actors or themes of the content, jokes or anecdotes related to the content, or simply personal observations about any subject. Viewer comments may be shared among a group of friends, or to a larger anonymous group of viewers. The sharing of such comments creates a mediated social interaction among scattered viewers reminiscent of, but more flexible than, the old-fashioned family gathering around the television set. U.S. Pat. No. 8,051,230 describes such a system allowing the sharing of spoken comments among users via a communications network. In accordance with the method of U.S. Patent Application 2012/0082427, the real-time comments may be assigned time stamps and be recorded with the associated time stamps, so that a viewer who accesses the primary media content at a later time may be presented with the recorded comments (the secondary media content) in synchrony with the primary media content upon playback.

An avid fan of a television series may wish to view and participate in the real-time social media commentary when viewing an episode, but also avoid unwitting exposure to spoilers. For an American viewer, this desire is complicated by a basic feature of the broadcast infrastructure in the United States. Standard network content is broadcast three times in the US broadcast system, first for the Eastern time zone, one hour later for the Central and Mountain time zones, and two hours after that for the Western time zone. Accordingly, fans in the Central and Mountain time zones may wish to view user-generated content originating from the Eastern time zone (the content having been time stamped and recorded for replay in synchrony with the video content) as well as de novo user-generated content originating from the Central and Mountain time zones. Fans in the Western time zone would similarly experience a combination of recorded and de novo user-generated content. A problem that arises in this circumstance is that a viewer on the East coast may continue to make comments about an episode after the broadcast has finished on the East coast; such comments may be picked up by a system displaying social media content during the broadcast to the Central/Mountain or Western time zones and be admixed with comments originating from naïve viewers in those time zones. Thus, comments from experienced viewers containing spoiler information may be inappropriately presented to naïve viewers, contrary to their desire to remain unaware of forthcoming content.

A proposed solution to this dilemma is presented in U.S. Patent Application 2011/0010774 (hereinafter '774), which describes a method for extracting meaning information from a message and determining whether to present the messages based on the meaning of the message. However, the method of '774 is inadequate to solving the above-stated problem owing to the known difficulty of accurately interpreting the linguistic content of a message and the computational burden required to perform such analysis.

What is desired is a method and system that appropriately filters and combines social media content for delayed presentation to a naïve viewer.

SUMMARY OF THE INVENTION

The present invention provides a system and method for distribution of a video stream together with associated media content.

One aspect of the present invention teaches a system and method for distribution of a video stream together with associated media content, the method comprising: during a current distribution of the video stream: retrieving a stored first media content associated with the video stream along with a stored associated first media offset time stamp; distributing the retrieved first media content with the video stream at a media offset time in the video stream corresponding to a time indicated by the retrieved first media offset time stamp; receiving a second media content associated with the video stream from a viewer; determining that the viewer has not previously viewed the video stream; associating the media offset time with the second media content as a second media offset time stamp; storing the second media content and the associated second media offset time stamp; and distributing the second media content with the video stream.

In another aspect of the present invention, the stored first media content is associated with a previous distribution of the video stream, wherein the previous distribution of the video stream is within a first geographical area; the current distribution is within a second geographical area different from the first geographical area; and the step of determining that the viewer has not previously viewed the video stream is responsive to a determination that the viewer is location within the second geographical area.

In yet a further aspect of the present invention, the current distribution of the video stream is by a video-on-demand service; and the step of determining that the viewer has not previously viewed the video stream is responsive to a determination that the viewer has not previously accessed the video stream through the video-on-demand service.

In a still further aspect of the present invention, the step of determining that the viewer has not previously viewed the video stream is responsive to a determination that the viewer has not generated any of the stored media content with an associated media offset time stamp greater than the second media offset time stamp.

In a still further aspect of the present invention, the current distribution of the video stream and the distribution of the retrieved first media content are accomplished by different means.

In a still further aspect of the present invention, the current distribution of the video stream and the distribution of the retrieved first media content are accomplished by the same means.

In a still further aspect of the present invention, the current distribution of the video stream and the distribution of the second media content are accomplished by different means.

In a still further aspect of the present invention, the current distribution of the video stream and the distribution of the second media content are accomplished by the same means.

In a still further aspect of the present invention, the stored first media content is received, during a previous distribution of the video stream, from a previous viewer.

In a still further aspect of the invention, a system for presentation of video content comprises: a stream distribution module configured to distribute a video stream; a media content storage and retrieval module configured to store and retrieve media content associated with the video stream an a media offset time stamp of media content creation relative to a time of the associated video stream; a content distribution module configured to retrieve the stored media content from the media content storage and retrieval module responsive to a media offset time of the video stream and distribute the media content; a content receiver module configured to receive media content associated with the video content from a viewer and associated a media offset time stamp with the media content based on the relative media time of the video stream at the time the media content was created; and a content analysis module configured to determine if received media content was created by a viewer who had not previously viewed the video stream, wherein the system is operative to: distribute the video stream from the stream distribution module; during a presentation of the video stream, receive at the content receiver module a first media content associated with the video stream generated by a viewer; upon receipt of the first media content, determine using the content analysis module whether the first media content was created by a viewer who had not previously viewed the video stream; and upon determining that the received first media content was created by a viewer who had not previously viewed the video stream, store the received first media content with an associated media offset time stamp using the media content storage and retrieval module and distribute the received first media content using the content distribution module.

In a still further aspect of the present invention, the content distribution module is configured to receive relative timing information from the stream distribution module.

In a still further aspect of the present invention, the content analysis module is configured to determine if the first media content was created by a viewer who had not previously viewed the video stream responsive to whether the viewer is located in a geographical location to which the video stream had not previously been distributed.

In a still further aspect of the present invention, the stream distribution module is a video-on-demand module; and the content analysis module is configured to determine if the first media content was created by a viewer who had not previously viewed the video stream responsive to whether the viewer had not previously viewed the video stream through the stream distribution module.

In a still further aspect of the present invention, the distribution of the video stream and the distribution of the first media content are accomplished by different means.

In a still further aspect of the present invention, the distribution of the video stream and the distribution of the first media content are accomplished by the same means.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

The preferred and alternative embodiments of the present invention are described in detail below with reference to the following drawings. In the drawings, like numbers refer to like items.

FIG. 6 illustrates examplary metadata encoded using Javascript Object Notation (JSON) protocol and describing the author of a social media tweet as implemented within an embodiment of the invention.

DETAILED DESCRIPTION OF THE INVENTION

Figure 1:
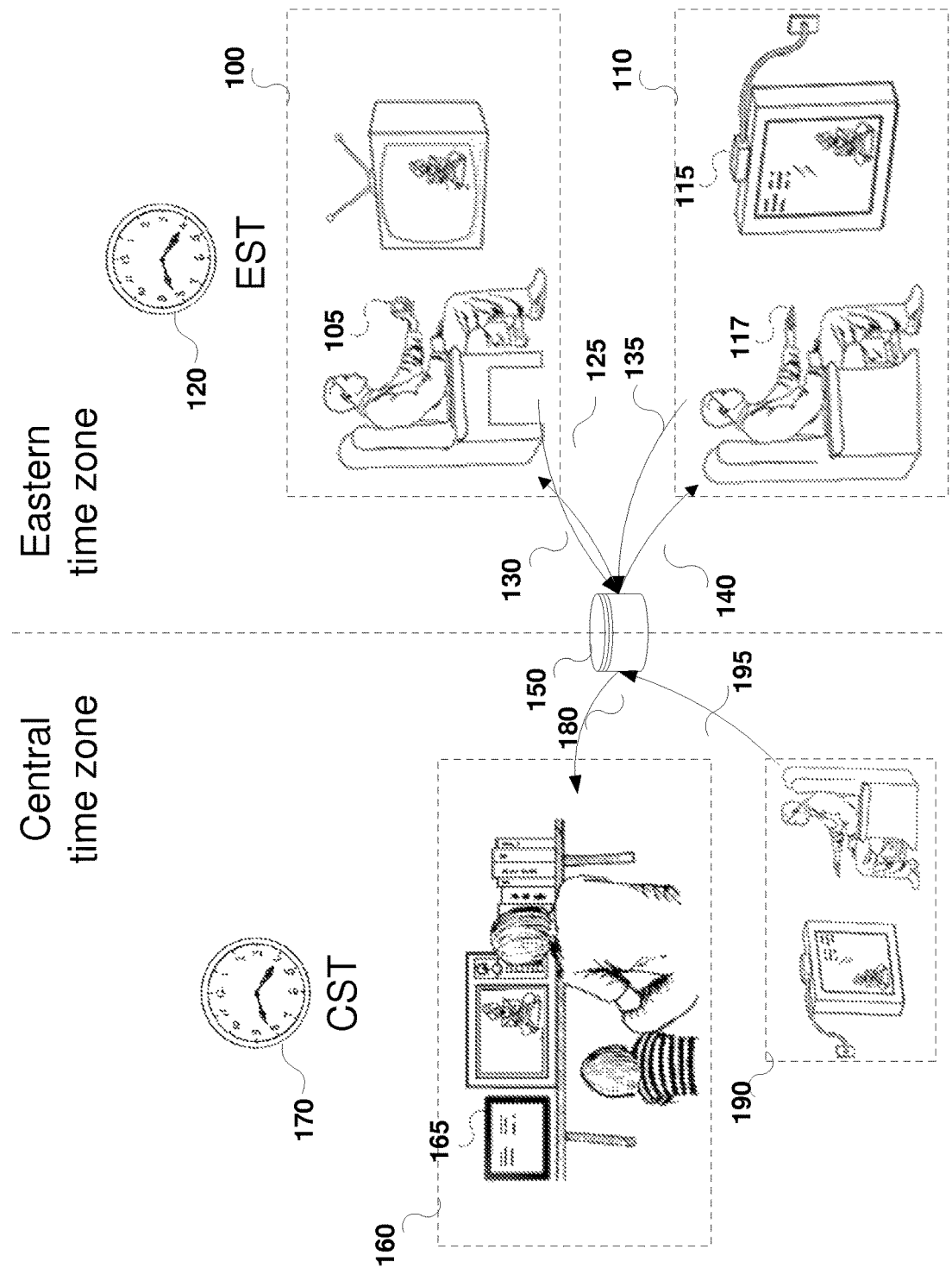
FIG. 1 is a schematic diagram depicting an exemplary scenario in which social media content are created and shared among viewing households located in different time zones.

By way of overview, embodiments of the present invention provide a method and system for playback of media content along with a video stream comprising: presenting a video stream to a first user device; retrieving from storage first media content associated with the video stream along with a time stamp relative to the video stream; presenting the first media content with the video stream at the time indicated by the time stamp to a second user device; receiving from a third user device second media content associated with the video stream; determining if the second media content is generated by a naïve viewer who has not previously seen the video stream; and if the second media content is generated by a naïve viewer of the video stream, associating a time stamp relative to the video stream with the second media content, storing the second media content with the associated time stamp, and presenting the second media content with the video stream to the second user device.

As used herein, the term "video stream" refers to video or video with associated audio conveyed in a single delivered stream of content. The video and audio content may be compressed or uncompressed. A video stream may be 'presented' in analog or digital form, and may be delivered by any appropriate means including inter alia as a physical media or as an evanescent photonic, electrical, or electromagnetic signal delivered by wired or wireless conveyance. The video stream may be broadcast, multicast, or unicast to many, a few, or one user device, respectively. Secondary media content may be presented using the same or different means as the video stream with which the secondary media content is associated. Furthermore, the video stream, with secondary media content, may be received at the user device, recorded, and played back for display at a later time, while remaining within the spirit and scope of the current invention.

As used herein, the terms "media content" and "secondary media content" refer to any object or collection of objects and/or data that can be stored, retrieved, and subsequently rendered on a user device. The media content may include inter alia text, sound, graphics, still images, or video, alone or in combination. Media content may be delivered by any appropriate means including inter alia as a physical media or as an evanescent photonic, electrical, or electromagnetic signal delivered by wired or wireless conveyance.

As used herein, the terms "social media" and "social media content" refer to an instance or a collection of instances of data or objects generated in the context of social interaction by formal, semi-formal or informal means, and distributed to or accessible by the participants of the social interaction. The participants in a social interaction may be known or unknown to one another. An item of social media content may further be accessible to others beyond the immediate participants in the interaction. A social interaction may but need not be mediated by a "social media device" which may be a desktop, laptop, or netbook computer; a tablet computer; a mobile phone, smart phone, Apple Touch™, Apple iPad™, Android Droid™, or similar mobile device; a smart television; or any other electronic device configured for the creation of social media content. Social media content may incorporate textual, numerical, visual, auditory or other data. A social interaction may involve inter alia an email exchange; a twitter exchange; a twiki posting and comments or responses to the twiki posting; a blog posting and comments or responses to the blog posting; a website posting and comments or responses to the website posting; submissions to a newsgroup; a review posting on a commerce website and comments or responses to the review posting; a video posted to YouTube or other public website and comments or responses to the video posting; and similar on-line activities. A social interaction may include inter alia an exchange of written correspondence, photographs, or printed material. A social interaction may include inter alia the display in a public forum of written, printed, or photographic material or the like, and responses to such display in similar form or by other means. The authorship of an item of social media content may be known through direct, indirect or inferential means, or may be unknown. Social media content may but need not be produced in the course of employment, that is, it may be produced as a consequence of professional or of non-professional activity.

As used herein, the phrase "naïve viewer" refers to a person who is viewing a video stream for the first time, that is, without having previously viewed the video stream and therefore lacking foreknowledge of the details of the content of the video stream. A naïve viewer would not be able to describe detailed elements of plot, exposition, or outcome of the events contained in the video stream as a consequence of not having experienced those elements by viewing the content of the stream. Thus for example a naïve viewer of a sporting event would not know the final score of the sporting event.

As used herein, the phrases "offset time" and "media offset time" refer to a period of time relative to the normal timeline of presentation of media. Specifically, the media offset time of a specific point in media content is the period of time that would elapse from the beginning of presentation of the media content to the specific point within the media content when the media content is presented in linear fashion according to its defined format. Media offset time starts at zero at the beginning of the media content, increases monotonically through the media content, and is entirely defined by the format of the media content. For example, the media offset time of a specific frame of video may be determined by counting the number of frames of video between the beginning of the video to the specific frame; the frame count can be converted to a clock time by reference to the frame rate of the video content. The media offset time of a particular point in the media content is the same regardless of the wall clock time at which or the manner by which the media content is presented.

The various aspects of the claimed subject matter are now described with reference to the annexed drawings. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. Additionally it should be appreciated that a carrier wave can be employed to carry computer-readable electronic data such as those used in transmitting and receiving electronic mail or in accessing a network such as the Internet or a local area network. Of course, those skilled in the art will recognize many modifications may be made to this configuration without departing from the spirit and scope of the claimed subject matter.

The term "computer" is used herein to refer to any device with processing capability such that it can execute instructions. Those skilled in the art will realize that such processing capabilities are incorporated into many different devices and therefore the term "computer" includes PCs, servers, mobile telephone, tablet computers, personal digital assistants and many other devices.

The methods described herein may be performed by software in machine readable form on a storage medium. The software can be suitable for execution on a parallel processor or a serial processor such that the method steps may be carried out in any suitable order, or simultaneously.

The description acknowledges that software can be a valuable, separately tradable commodity. The description is intended to encompass software, which runs on or controls 'dumb' or standard hardware, to carry out the desired functions. It is also intended to encompass software which 'describes' or defines the configuration of hardware, such as HDL (hardware description language) software, as is used for designing silicon chips, or for configuring universal programmable chips, to carry out desired functions.

The steps of the methods described herein may be carried out in any suitable order, or simultaneously where appropriate. Aspects of any of the examples described herein may be combined with aspects of any of the other examples described to form further examples without losing the effect sought.

FIG. 1 depicts a scenario involving households 100, 110, 160, 190 viewing a television episode. Two households 100, 110 are located in the Eastern time zone, and a clock 120 associated with those households 100, 110 is set to Eastern Standard Time (EST). During the distribution of the television episode in the Eastern time zone, a viewer in household 100 is watching a terrestrial broadcast of the episode content and uses a cell phone 105 to tweet comments 125 about the content of the episode. Meanwhile, a viewer in household 110 is using a set-top box (STB) 115 to view a cable distribution of the episode content, and uses a remote control 117 to interact with an interactive application running on the STB 115 to create comments 135 about the content of the episode. Social media content 125 created by a viewer in household 100 and social media content 135 created by a viewer in household 110 are communicated to a processing and storage system 150. As each piece of social media content 125, 135 is received by processing and storage system 150 the piece of social media content 125, 135 is associated with the media offset time at which the social media content was received at processing and storage system 150, and the associated media offset time is stored together with the social media content 125, 135. Social media content 125, 135 can be distributed to any household receiving the episode in the Eastern time zone. Preferentially social media content 125, 135 is distributed to all households receiving the episode in the Eastern time zone with minimal delay after being received by processing and storage system 150. Thus household 100 receives social media content 130 from processing and storage system 150 during the broadcast of the episode, and household 110 receives social media content 140 during the broadcast of the episode. Social media content 130 distributed to household 100 includes social media content 135 created by a viewer in household 110, along with other social media content created by viewers in other households. Social media content 140 distributed to household 110 includes social media content 125 created by a viewer in household 100, along with other social media content created by viewers in other households. In this exemplary scenario, the shared social media content 130 can be received and displayed in household 100 by an application executing on a cell phone, whereas in household 110 the shared social media content 140 can be received and displayed by the application executing on the STB 115.

A household 160 located in the Central time zone is associated with a clock 170 that is set to Central Standard Time (CST), which is one hour behind EST. Household 160 receives the episode one hour later than the episode was distributed in the Eastern time zone. The episode content is received by household 160 over an Internet Protocol Television (IPTV) system. During the broadcast of the episode to household 160, the processing and storage system 150 communicates social media content 180 including social media content 125, 135 that was received from households in the Eastern time zone and stored in processing and storage system 150. Social media content 180 is conveyed to household 160 in synchrony with the episode content, by presenting each piece of social media content at the media offset time associated with the social media content in processing and storage system 150, the media offset time being measured relative to the broadcast of the episode content in the Central time zone. Viewers in household 160 receive and display the social media content using a tablet computer 165. Newly-created social media content 195 from a viewer viewing the episode in another household 190 in the Central time zone is also stored by the processing and storage system 150 along with the associated media offset time at which the social media content 195 is received by processing and storage system 150, the media offset time being determined relative to the broadcast of the episode content in the Central time zone. Newly-created social media content 195 is conveyed to household 160 as part of social media content 180. Any social media content created by viewers in household 160 can likewise be stored and distributed to any household receiving the episode in the Central time zone. Preferentially any social media content created by a viewer in the Central time zone is distributed to all households receiving the episode in the Central time zone with minimal delay after being received by processing and storage system 150.

In the depicted scenario, viewers in the Eastern time zone can create social media content, and the social media content is immediately shared with other viewers in the Eastern time zone, so that the timeliness of the social media content is maintained among the viewers. A comment made by one viewer about a particular scene in the episode content is seen by other viewers with minimal delay, thereby enhancing their experience of the episode content. In this scenario, the broadcast in the Eastern time zone is the first broadcast of the television episode, so all comments made during the broadcast are known to come from naïve viewers who have never seen the content before. When the episode is broadcast an hour later in the Central time zone, the social media content generated in the Eastern time zone is conveyed to households in the Central time zone in synchrony with the episode content through the use of media offset times associated with each piece of social media content. By this means a comment about a particular scene in the episode content will be seen along with the scene, duplicating the viewer experience of the social media content in the Eastern time zone. Viewers in the Central time zone have not received this episode before. If viewers in the Central time zone create additional social media content while viewing the episode, this new social media content is shared with viewers in the Central time zone with minimal delay, and is added to the stored social media content to be synchronously distributed with later broadcasts of the same episode.

The scenario in FIG. 1 illustrates that television content can be distributed in a variety of ways. The scenario further illustrates that social media content can be created and displayed on a variety of devices, and that the creation and display of social media content may be connected with or distinct from the display of primary video content.

Figure 2:
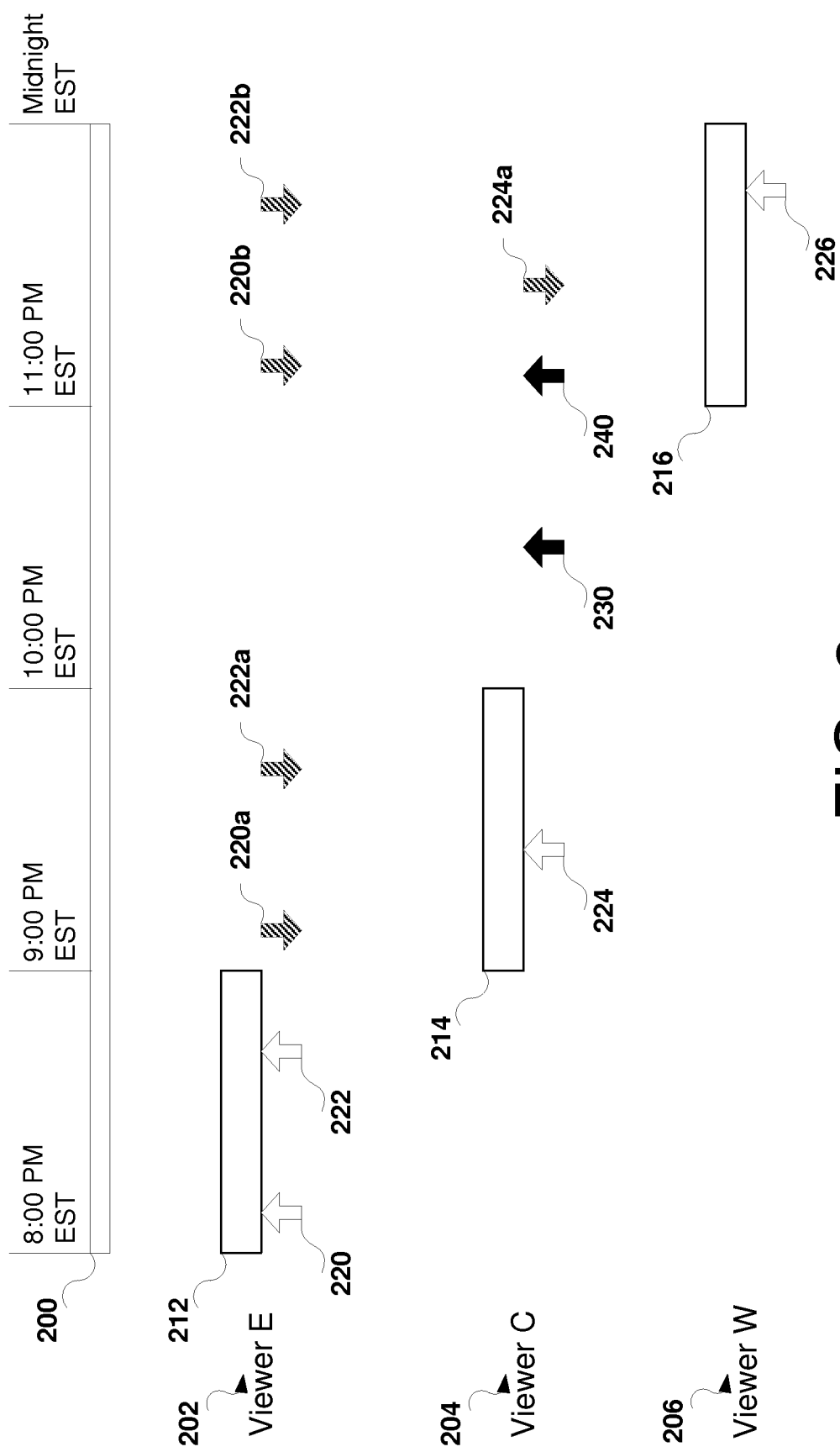
FIG. 2 is a schematic diagram illustrating an exemplary temporal sequence of activities involving the inventive system and users of the system.

FIG. 2 illustrates by way of example a temporal sequence of activities among users of an exemplary implementation of the inventive method and system. In the figure, time increases from left to right and the activities of three individual users are displayed in horizontal rows. Timeline 200 depicts the progression of time in the Eastern time zone from 8:00 PM EST through Midnight EST, a period of time during which viewers 202, 204, 206 each watch the same episode 212, 214, 216 of a broadcast television series.

Viewer E 202, who lives in the Eastern time zone, views an episode 212 being aired in that time zone from 8:00 PM EST to 9:00 PM EST. During the viewing of the episode 212, viewer E 202 creates a comment 220 about the episode at time 8:07 PM EST, and creates another comment 222 at time 8:42 PM EST. Since this is the first time the episode has been presented, the comments 220, 222 are known to come from a naïve viewer. The comments 220, 222 are recorded, along with the time stamps denoting the relative time within the content that the comments were created, and are delivered to other viewers (e.g. viewers 100 and 110) of episode 212 in the Eastern time zone. In this example, a viewer may create a comment using a social media site or service by typing on a laptop or notebook computer, an iPad, or a smart phone; by sending a text message using a mobile phone or smart phone; by entering the comment directly using the remote control of a smart television; or by any other method known in the art for creating social media content.

Starting at 9:00 PM EST, episode 214 (where episode 214 may correspond to the same media content as episode 212 but is broadcast at a different time) is broadcast within the Central and Mountain time zones, and Viewer C 204, who lives in the Central time zone, starts viewing episode 214 at 8:00 PM CST. Viewer C 204 has not previously viewed the episode and is thus naïve. Viewer C 204 and other viewers viewing episode 214 (not shown) are presented with the comments 220, 222 made by Viewer E 202 in synchrony with the video content. Comment 220, originally created at 8:07 PM EST, is delivered to Viewer C 204 and other viewers in the Central and Mountain time zones as comment 220a at 9:07 PM EST (8:07 PM CST). Comment 222, originally created at 8:42 PM EST, is delivered to Viewer C 204 and other viewers in the Central and Mountain time zones as comment 222a at 9:42 PM EST (8:42 PM CST). Thus delayed, comments 220a and 222a appear in synchrony with the portions of episode 214 originally viewed by Viewer E 202 when comments 220, 222 were created. Viewer C 204 in turn creates comment 224 at 9:28 PM EST (8:28 PM CST); this comment is determined to come from a naïve viewer, and so is recorded along with the appropriate time stamp, and presented to other viewers of episode 214 in the Central and Mountain time zones.

Starting at 11:00 PM EST, the episode 216 is broadcast within the Pacific time zone, and Viewer W 206, who lives in the Pacific time zone, starts viewing episode 216 at 8:00 PM Pacific Standard Time (PST). Viewer W 206 has also not previously viewed the episode and is thus naïve. Viewer W 206 and other viewers viewing episode 216 in the Pacific time zone (not shown) are presented with comments 220, 222 made by Viewer E 202, as well as comment 224 made by Viewer C 204, in synchrony with the video content. Comment 220b, originally created at 8:07 PM EST, is delivered to Viewer W 206 and other viewers in the Pacific time zone at 11:07 PM EST (8:07 PM PST); comment 224a, originally created at 9:28 PM EST (8:28 PM CST), is delivered to Viewer W 206 and other viewers in the Pacific time zone at 11:28 PM EST (8:28 PM PST); and comment 222b, originally created at 8:42 PM EST, is delivered to Viewer W 206 and other viewers in the Pacific time zone at 11:42 PM EST (8:42 PM PST). Viewer W 206 creates comment 226 at 11:50 PM EST (8:50 PM PST); the comment is determined to come from a naïve viewer, and is recorded along with the appropriate time stamp, and presented to other viewers of episode 216 in the Pacific time zone.

The inventive system incorporates the feature of receiving and storing social media content with associated time stamps. Thus, following the broadcast of episode 216 in the Pacific time zone, all comments 220, 222, 224, 226 created by naïve viewers during the original broadcasts 212, 214, 216 of the episode are stored by the inventive system, and are available for presentation during subsequent viewing of the episode. Thus, if the episode video stream were presented at a later time on a later day to a viewer for display on a user device, recorded comments 220, 222, 224, 226 can be presented to a user device in accordance with their respective time stamps. More specifically, at 7 minutes into the video stream, comment 220 is presented to a user device; at 28 minutes into the video stream, comment 222 is presented to a user device; at 42 minutes into the video stream, comment 224 is presented to a user device; and, at 50 minutes into the video stream, comment 226 is presented to a user device.

In the inventive system, if the video stream is presented non-linearly to a user device, for example if the user utilizes the features of pause, rewind, or fast forward in the delivery and display of the video stream, the social media content is presented in accordance with the non-linear presentation of the video stream. That is, the time of presentation of secondary social media content is made to correspond to the relative time of the video stream corresponding to the time stamp of each element of social media content, regardless of the rate of presentation of the video stream, and regardless of any non-linear progression through the video stream. If the video stream is paused, the presentation of social media content is paused. If the video stream is rewound and replayed, an element of social media content may be presented more than once as the corresponding relative time of the video stream is reached. If the video stream is displayed at a faster-than-normal rate, elements of social media content may be presented more quickly than the original rate of presentation of the elements of social media content.

Where comments are made outside of the broadcast or first-playback time period, it is preferred to treat such social media content as not originating from a naïve user. Such comments are shown by elements 230 and 240 in FIG. 2, where the social media content is produced by viewer C after the broadcast (or any local playback by viewer C on their digital video recorder (DVR)) had occurred. That is, if a new element of social media content is received for which the source location of the new social media content is not within the reception region of a current broadcast of the video stream, then the new social media content is judged not to be from a naïve viewer since the creator of the new social media content cannot be viewing the current broadcast of the video stream and must therefore have seen the video stream previously.

Figure 3:
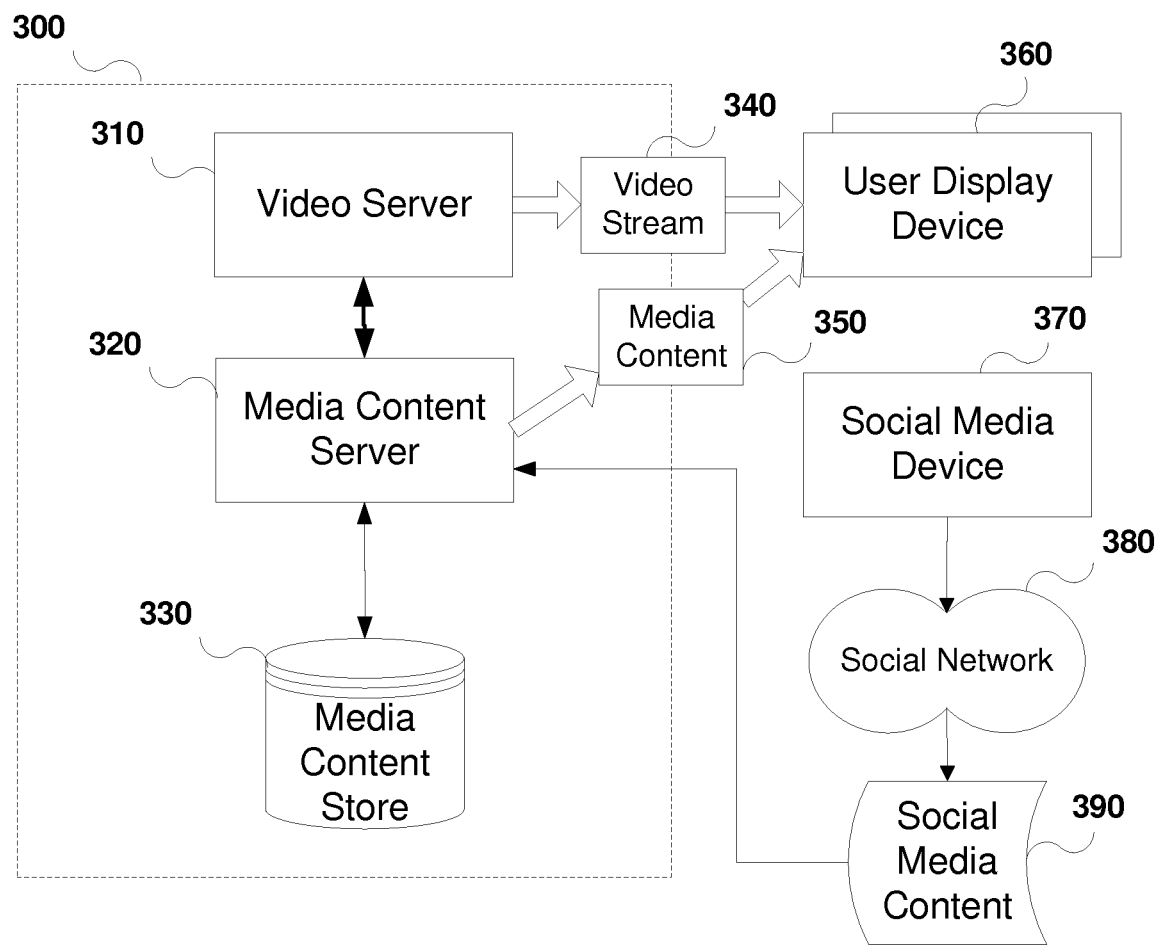
FIG. 3 is a block diagram depicting elements of an exemplary system configured to practice an aspect of the inventive method and system.

FIG. 3 depicts elements of an exemplary system 300 configured to practice an aspect of the inventive method. A video server 310 serves a video stream 340 to one or more user display device 360. Video server 310 provides timing information to a media content server 320 signaling the relative time within the served video stream 340. During the presentation of the video stream 340, media content server 320 examines the contents of media content store 330 to determine if there are is any stored social media content associated with the served video stream 340 with a time stamp corresponding to the relative time of the served video stream 340. If media content server 320 finds such stored social media content, the media content 350 is presented to the one or more user display device 360 at the appropriate time within the video stream broadcast, where the appropriate time is indicated by a time stamp associated with the stored social media content.

During the presentation of video stream 340, the user of a user display device 360 may generate social media content 390 through the use of a social media device 370. The social media content 390 is conveyed through social network 380, and is retrieved from the social network 380 by media content server 320. Based on attributes of social media content 390, media content server 320 determines if the social media content 390 originated from a naïve viewer of video stream 340. If social media content 390 originated from a naïve viewer of video stream 340, social media content 390 is stored in media content store 330 along with a time stamp signaling the relative time within the served video stream at which the social media content 390 was created, and social media content 390 is presented as media content 350 to one or more user display device 360.

Video stream 340 may be stored in video server 310, or may be retrieved by video server 310 from a media store (not shown in FIG. 3). Video stream 340 may be conveyed to user display device 360 as an evanescent photonic, electrical, and/or electromagnetic signal delivered by wired or wireless conveyance, or may be conveyed as a physical artifact such as a Digital Versatile Disc (DVD), Blu-ray disc, thumb drive, portable hard drive, or by other means known in the art. Video stream 340 and media content 350 may be conveyed by the same or by different means to user display device 360. Video stream 340 and media content 350 may be conveyed to the same user display device 360 or may be delivered to different user display devices 360. For example, video stream 340 may be delivered to and displayed on a television set, while media content 350 may be delivered to and displayed on a tablet computer operated by a viewer of the television set. In an alternative embodiment, media content 350 may be conveyed to social media device 370 for display.

Social media device 370 may be integral to user display device 360, or may be a separate physical unit. Social media device 370 may be a desktop, laptop, or netbook computer; a tablet computer; a mobile phone, smart phone, Apple Touch™, Apple iPad™, Android Droid™, or similar mobile device; a smart television; or any other suitable electronic device known in the art. Social media content 390 may be generated through hardware and/or software embodied within social media device 370; or may be generated through hardware and/or software embodied within a server accessible through a wired or wireless network 380; or may be generated through a combination of hardware and/or software embodied within social media device 370 and within a server accessible through a wired or wireless network 380, or by other means known in the art. Social media content 390 may be delivered indirectly from social media device 370 to media content server 320 through a wired or wireless social network 380, or may be delivered directly from social media device 370 to media content server 320, or may be partly conveyed indirectly through social network 380 and partly conveyed directly to media content server 320. Metadata describing social media content 390, including for example the name, location, time zone, viewing status, and viewing history of the user of social media device 370, may be provided to media content server 320 from social network 380; may be provided to media content server 320 directly from social media device 370; may be incorporated within social media content 390; or may be acquired by other means by media content server 320. Metadata describing social media content 390 may be used by media content server 320 in determining whether social media content 390 is generated by a naïve viewer of video stream 340. The metadata associated with the social media content 390 may include, for example, the identity of the creator and the time, the location, and the time zone of the point at which the social media content was created.

The functions of video server 310, media content server 320, and media content store 330 may be realized through hardware, software, or a combination of hardware and software; may be realized by separate systems or by a single system in any combination; and may be realized at a single location or at distant locations. Communication between video server 310 and media content server 320, and between media content server 320 and media content store 330, may be by any wired or wireless means, including inter alia a wired computer bus, serial port, parallel port, Ethernet, USB, FireWire, or wireless hub, or by any combination of such means. Similarly, communication between social media device 370 and social network 380, between social media device 370 and media content server 320, and between social network 380 and media content server 320, may be by any wired or wireless means known in the art, or by any combination of such means.

In an alternative embodiment of the system 300, when video stream 340 is conveyed by means of a physical artifact such as a DVD or Blu-ray disc to user display device 360, user display device 360 provides relative timing information to media content server 320 to allow media content server 320 to retrieve associated media content 350 from media content store 330 in a synchronous manner. In this case, the display of video stream 340 by user display device 360 may involve non-linear presentation as discussed above.

Figure 4:
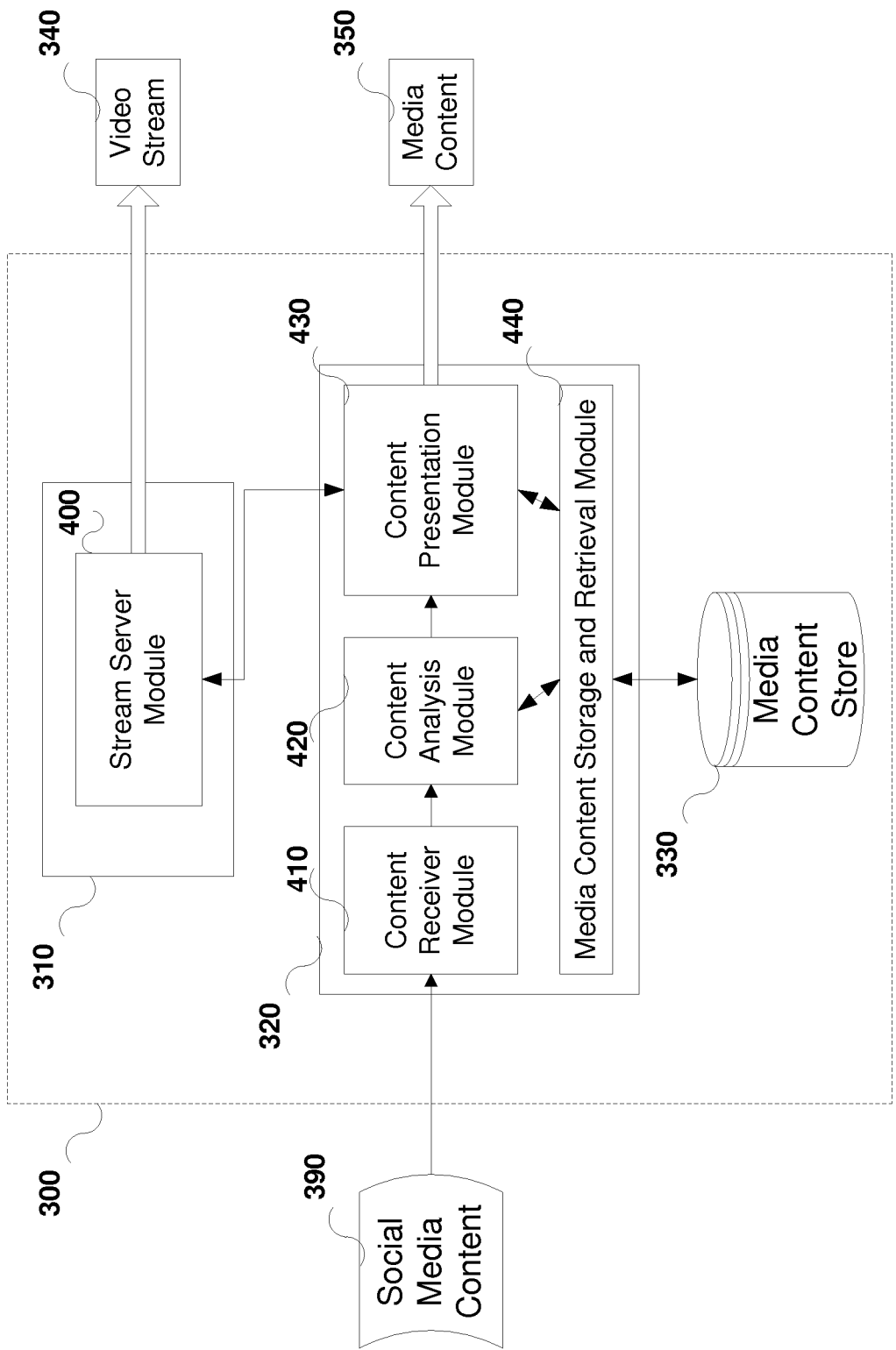
FIG. 4 is a block diagram further depicting elements of an exemplary system configured to practice an aspect of the inventive method and system.

FIG. 4 further depicts an embodiment of a system 300 configured to practice an aspect of the inventive method. Video server 310 includes a stream server module 400 configured to provide a video stream. Stream server module 400 may be for example a broadcast server providing an electromagnetic signal for terrestrial, satellite, and cable distribution to multiple households. In an alternative embodiment, stream server module 400 may be a web server providing an Internet Protocol (IP) stream of packets comprising a compressed video stream utilizing the Transmission Control Protocol (TCP) for conveyance to a single user display device; utilizing the User Datagram Protocol (UDP) for conveyance to one or multiple user display devices; utilizing the Real-time Transport Protocol (RTP) for conveyance to one or multiple user display devices; or utilizing some other standard or proprietary transport protocol. In yet another alternative embodiment, stream server module 400 may be a video-on-demand (VOD) server providing a digitized video stream through a cable transmission system to a single user display device.

In the embodiment of system 300 depicted in FIG. 4, media content server 320 includes content receiver module 410 for receiving social media content 390. Content receiver module 410 may receive social media content directly from social media devices through a wired or wireless communication channel. Alternatively, media content server 320 may receive social media content indirectly by reading tweets from a Twitter feed; by retrieving data using the Facebook Platform application programming interface (API); by monitoring a Really Simple Syndication (RSS) feed; by downloading email from a mail server; by receiving Hypertext Transfer Protocol (HTTP) POST, GET, or PUT messages; by receiving telephonic text messages; or by any combination of these or other data transfer and extraction methods known in the art. Social media content 390 may be retrieved by content receiver module 410 contemporaneously with the creation of social media content 390, or may be retrieved by content receiver module 410 at some delay after the time of creation of social media content 390. When social media content 390 is received, metadata associated with the social media content 390 are retrieved, including for example the identity of the creator and the time, location and time zone of the point at which the social media content was created. Metadata may be retrieved using the same means used to retrieve social media content 390, or may be retrieved by other means such as those described above, or by other means known in the art. For example, if social media content 390 is received from a cable television subscriber through a cable television return path, metadata may be retrieved from the cable television multisystem operator (MSO). As a further example, if social media content 390 is received as a text message from a mobile device, metadata may be retrieved from the mobile device service provider.

Content receiver module 410 passes received social media content, with any associated metadata, to content analysis module 420. Content analysis module 420 uses the social media content and associated metadata to determine if social media content 390 originated from a naïve viewer of video stream 340. Exemplary methods for determining if social media content originates from a naïve viewer of media content are described below in conjunction with the discussion of FIG. 5. If content analysis module 420 determines that social media content 390 originated from a naïve viewer of video stream 340, content analysis module 420 passes social media content 390, with associated metadata and relative timing information, to media content storage and retrieval module 440 for storage in media content store 330. Additionally, if content analysis module 420 determines that social media content 390 originated from a naïve viewer of video stream 340, content analysis module 420 passes social media content 390 to content presentation module 430 for delivery in media content 350.

Throughout the delivery of video stream 340, content presentation module 430 queries media content storage and retrieval module 440 to determine if any social media content is stored in media content 330 related to video stream 340 with a time stamp corresponding to the current relative time of video stream 340. If such social media content exists, content presentation module 430 receives social media content from media content storage and retrieval module 440, and delivers media content 350 to user display device 360 in synchrony with the delivery of video stream 340.

Content presentation module 430 may receive relative timing information directly from stream server module 400. In an alternative embodiment where stream server module is a broadcast stream providing video stream 340 according to a broadcast schedule, content presentation module 430 may receive broadcast schedule information from stream server module 400 or by other means and may determine the relative timing of video stream 340 based on current clock time. In yet another alternative embodiment where video stream 340 is provided as a physical artifact such as a DVD or Blu-ray disc, content presentation module 430 may receive relative timing information directly from user display device 360.

The functions of modules 400, 410, 420, 430, 440 may be provided by hardware, software, or any combination of hardware and software. Further, the modules 400, 410, 420, 430, 440 may be provided by a single physical system or by multiple physical systems. The systems providing the functions of modules 400, 410, 420, 430, 440 may be located in a single physical location, or may be located in multiple physical locations. Communication among modules 400, 410, 420, 430, 440 and between modules 400, 410, 420, 430, 440 and external devices may be through any wired or wireless means known in the art. All such alternatives, and others apparent to those skilled in the art, fall within the spirit and scope of the invention.

Figure 5:
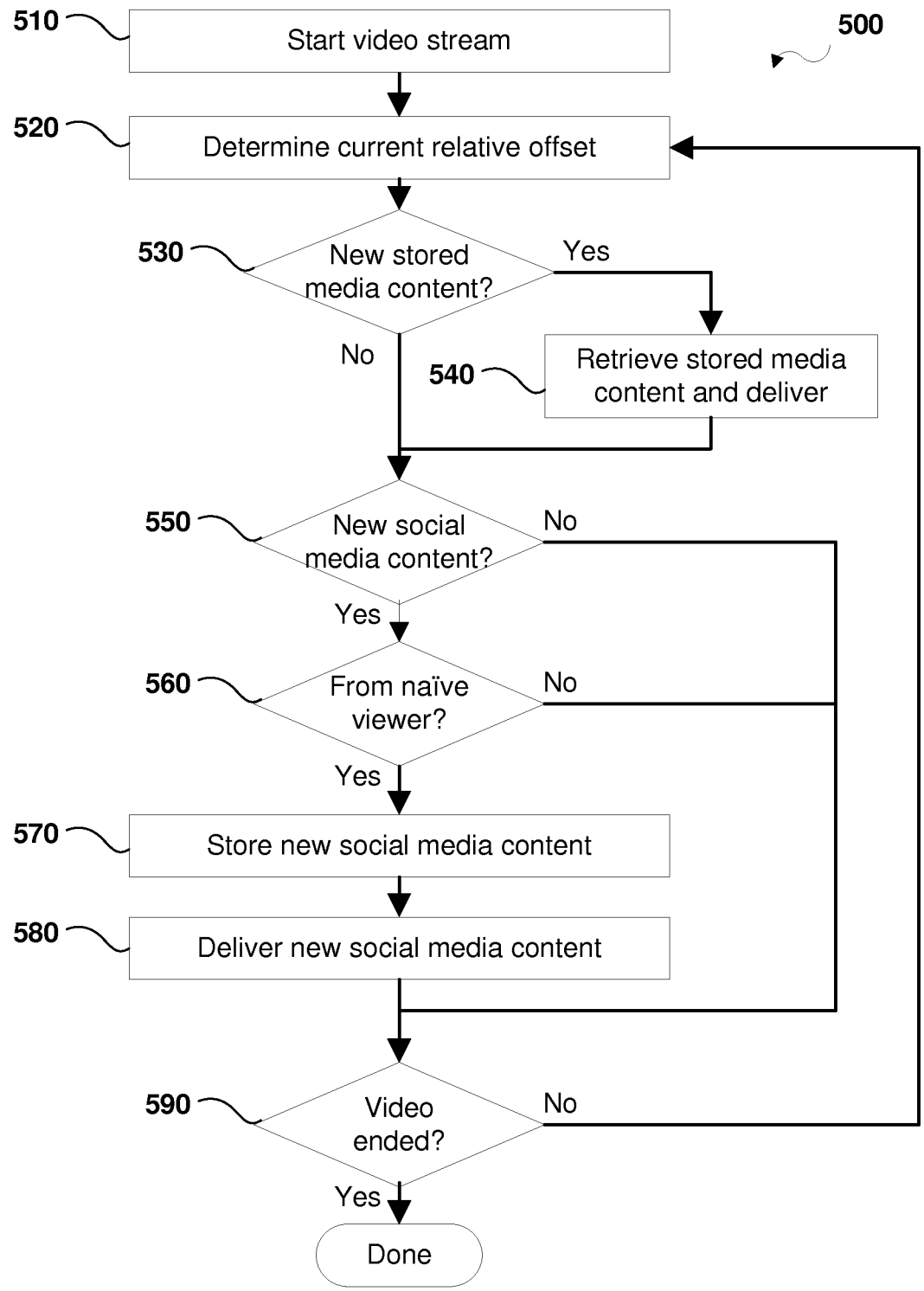
FIG. 5 illustrates a flowchart delineating the high-level steps of an exemplary implementation of the inventive method.

FIG. 5 depicts steps of an exemplary process 500 implementing an aspect of the inventive method. At a step 510 a video stream is presented to a user device. At a further step 520 the current media offset time of the video stream is determined. At a further step 530, a test is made to determine if a store of media content contains any stored media content related to the video stream with a time stamp between the previous media offset time and the current media offset time.

If such stored media content is found, at a further step 540 the stored media content is retrieved and delivered to a user device. At a further step 550 a test is made to determine if new social media content is available. If no new social media content is available, then the process proceeds at a step 590. If new social media content is available, at a further step 560 the new social media content is checked to determine if the content was created by a naïve viewer. If the new social media content was not created by a naïve viewer, then the process proceeds at a step 590. If the system determines that the new social media content was created by a naïve viewer, then at a further step 570 the new social media content is stored, along a time stamp corresponding to the current media offset time, in a store of media content; and at a further step 580 the new social media content is delivered to a user device. At a further step 590 a test is made to determine if the video stream has ended. If the video stream has not ended, the process continues at a step 520. If the video stream has ended, process 500 terminates.

At step 560, the test to determine whether new social media content was created by a naïve viewer is based upon metadata associated with the new social media content, and may be based on the history of streaming the video stream. For example, as depicted in FIG. 2, in a broadcast environment a video stream may be broadcast multiple times in different time zones. If a new element of social media content is received for which the source location of the new social media content is not within the reception region of a current broadcast of the video stream, then the new social media content is judged not to be from a naïve viewer, since the creator of the new social media content cannot be viewing the current broadcast of the video stream, and must therefore have seen the video stream previously. This case is illustrated in FIG. 2, where comment 230 is created by Viewer C 204, during a period in which the video stream is not being broadcast. Comment 230 can thus be judged not to be from a naïve viewer, and is not stored or displayed.

Note that the test performed at a step 560 is in contradistinction to the method of '774, in which processing of social media content requires analyzing the meaning of the social media content. In the inventive method and system, the determination of whether new social media content was created by a naïve viewer is made independent of the specific data contained within the social media content. The inventive method and system thereby avoid the problematic and error-prone step of determining the precise meaning of social media content.

In the inventive method and system, the test at a step 560 utilizes metadata associated with the new social media content, that is, information about the social media content or the circumstances of the creation of the social media content, rather than the information contained within the social media content itself. Multiple types of metadata from multiple sources may be used in this test. For example, if a new element of social media content is received for which the source location of the new social media content is within a first time zone that received an earlier broadcast of the video stream, but the new element of social media content was created while the video stream is being broadcast within a second later time zone, then the new social media content is judged not to be from a naïve viewer, since the creator of the new social media content may have seen the video in the first time zone prior to the current broadcast in the second time zone. This case is illustrated in FIG. 2, where comment 240 is created by Viewer C 204 during a period in which the video stream is being broadcast in the Pacific time zone. Since Viewer C is physically located in the Central time zone, Viewer C could have seen the video stream at a prior broadcast 214 and comment 240 can be judged not to be from a naïve viewer.

FIG. 2 illustrates another rule that can be utilized to determine if an element of social media content is created by a naïve viewer. Viewer C 204 creates comment 224 which is judged to be from a naïve viewer and is stored in the media content store along with the time stamp when the comment was created. Subsequently Viewer C 204 creates comments 230 and 240, which are created after the termination of the delivery of video stream 214. When comment 230 or 240 is received, the media content store is examined to determine if any stored media content was created by the author of the new comment. In this case, comment 224 is found within the media content store. It is then determined that the video stream broadcast in effect when comment 224 was created has completed, and a judgment is made than any subsequent comment made by the same author is not from a naïve viewer. That is, Viewer C 204 was viewing video stream 214 when comment 224 was created. Since comments 230 and 240 were created after the termination of video stream 214, which was being viewed by the author of comments 224, comments 230 and 240 from the same author can be judged not to be from a naïve viewer. Note that this determination is not based on the location at which comments 230 and 240 were created nor on the local time zone in which comments 230 or 240 were created, but only on the inferred viewing history of the author of comments 224, 230, and 240.

Other methods of determining the viewing history of the author of an element of social media content may be used at a step 560 when determining whether an element of social media content was created by a naïve viewer of a video stream. For example, a record of use of an interactive television application broadcast during the broadcast of a television episode may indicate that a user device was used to view the television episode, and that the user of the device may thereby be judged to have previously viewed the television episode. If the user device were to be used subsequently to create an element of social media content, then the element may be judged not to come from a naïve viewer.

The following example will illustrate an exemplary implementation of a step 560 to determine whether specific social media content was authored by a naïve viewer. In this exemplary system, media content server 320 is collecting social media content for a specific television show ("My New Show"). The broadcast schedule for "My New Show" is available to media content server 320, and specifically to content analysis module 420, with the schedule specifying the time interval during which the video content is broadcast in each time zone. Media content receiver module 410 collects social media content by using a Twitter API to retrieve tweets from www.twitter.com (details of the Twitter API are available at dev.twitter.com, retrieved Sep. 9, 2012). Specifically, media content receiver module 410 subscribes to a public stream from twitter.com filtered with a hashtag associated with the television show (typically "#mynewshow"). The content of the public stream comprises a set of tweets encoded using the Javascript Object Notation (JSON) protocol which is parsed by the media content receiver 410. The JSON content of a single tweet will contain the text of the tweet, encoded for example as:

"text":"Tonight's show is really exciting. I love how Jamie's character is becoming more and more complex"

The JSON content of the tweet will also include metadata about the tweet. One of the elements of metadata describes the author of the tweet, encoded for example as shown in FIG. 6

Another element of the metadata stipulates the time at which the tweet was authored, encoded for example as:

"created_at":"Wed Aug 27 05:30:18 +0000 2012"

The metadata might also include information about the location from which the tweet originated, encoded for example as:

"coordinates": {"coordinates": [−75.14310264, 40.05701649], "type":"Point"}

Media content receiver 410 processed each tweet to retrieve the textual content of the tweet and to obtain a unique identifier for the author of the tweet (from the "id_str" element 654 of the "user" metadata); a time zone for the author (from the "time_zone" element 666 of the "user" metadata); a location from which the tweet originated (from the "coordinates" metadata); and the time at which the tweet was authored (from the "created_at" metadata). These metadata are passed, with the textual content of the tweet, to content analysis module 420 to make a determination if the author of this tweet is a naïve viewer.

As an example of how such a determination may be performed, by using the time at which the tweet was authored, content analysis module 420 could determine that the tweet was authored during the first time the video content was broadcast, and that the author must have been a naïve viewer of the video content.

As a further example, content analysis module 420 could use the coordinate data to determine the time interval during which the video content was broadcast at that location, and determine from the time zone and creation date if the tweet was authored during the broadcast of the video content at the origination location. If the tweet was authored during the proper time interval for the origination location, content analysis module 420 could determine that the tweet was authored by a naïve viewer.

As a yet further example, content analysis module 420 can use the unique author identifier to determine whether this author has posted previous tweets referencing the television show hashtag. If this author posted a message containing the hashtag at an earlier time from a location in a different time zone during the interval during which the video content was being broadcast within that time zone, then content analysis module 420 could determine that the author is not naïve, since the author could have viewed the content at that different location during the earlier broadcast.

When performing the test for a naïve viewer at a step 560, content analysis module 420 can use any of the exemplary rules described above, alone and in combination, as well as additional rules described herein, and other rules that would be obvious to those skilled in the art.

The test for a naïve viewer at a step 560 may be permissive or exclusionary. That is, the test may be permissive and determine that a viewer is naïve unless specific evidence demonstrates otherwise; or the test may be exclusionary and determine that a viewer is not naïve unless specific evidence demonstrates otherwise. For example, in an alternative embodiment of system 300 where video server 310 is a VOD system, a permissive test at a step 560 could determine if the author of an element of social media content created during the presentation of a video stream has previously viewed the video stream using the VOD system, and if the author has not previously viewed the video stream, judge the author to be a naïve viewer. In this alternative embodiment, a restrictive test at a step 560 could determine that any author of an element of social media content created during the presentation of a video stream by the VOD system is not a naïve viewer, since the video stream may previously been presented by another system to which the author may have had access.

The steps of exemplary process 500 may be performed by a single system at a single site or by multiple systems at multiple sites, and may be performed in the sequence shown, in other sequences not shown, serially, in parallel, or in other combinations, without departing from the spirit and scope of the invention.

While preferred embodiments of the invention have been illustrated and described, as noted above, many changes can be made without departing from the spirit and scope of the invention. Accordingly, the scope of the invention is not limited by the disclosure of a preferred embodiment. Instead, the invention should be determined entirely by reference to the claims that follow.

What is claimed is:

1. In a computer system, a method for distribution of a video stream together with associated media content, the method comprising:
  during a current distribution of the video stream:
    retrieving a stored first media content associated with the video stream along with a stored associated first media offset time stamp;
    distributing the retrieved first media content with the video stream at a first media offset time in the video stream corresponding to a time indicated by the retrieved first media offset time stamp;
    receiving a second media content associated with the video stream from a viewer;
    determining whether the viewer has previously viewed the video stream; and
    when the viewer has not previously viewed the video stream:
      associating a second media offset time with the second media content as a second media offset time stamp;
      storing the second media content and the associated second media offset time stamp; and
      distributing the second media content with the video stream at a second media offset time in the video stream corresponding to a time indicated by the second media offset time stamp; and
    when the viewer has previously viewed the video stream, until at least the video stream has ended:
      bypass storing the second media content; and
      bypass distributing the second media content.

2. The method of claim 1, wherein:
  the stored first media content is associated with a previous distribution of the video stream and wherein the previous distribution of the video stream is within a first geographical area;
  the current distribution is within a second geographical area different from the first geographical area; and
  the step of determining that the viewer has not previously viewed the video stream is responsive to a determination that the viewer is located within the second geographical area.

3. The method of claim 1, wherein:
  the current distribution of the video stream is by a video-on-demand service; and
  the step of determining that the viewer has not previously viewed the video stream is responsive to a determination that the viewer has not previously accessed the video stream through the video-on-demand service.

4. The method of claim 1, wherein the step of determining that the viewer has not previously viewed the video stream is responsive to a determination that the viewer has not generated any of the stored media content with an associated media offset time stamp greater than the second media offset time stamp.

5. The method of claim 1, wherein the current distribution of the video stream and the distribution of the retrieved first media content are accomplished by different means.

6. The method of claim 1, wherein the current distribution of the video stream and the distribution of the retrieved first media content are accomplished by the same means.

7. The method of claim 1, wherein the current distribution of the video stream and the distribution of the second media content are accomplished by different means.

8. The method of claim 1, wherein the current distribution of the video stream and the distribution of the second media content are accomplished by the same means.

9. The method of claim 1, wherein the stored first media content is received, during a previous distribution of the video stream, from a previous viewer.

10. A system for presentation of video content, the system comprising:
a processor; and
a memory, coupled to the processor, having a program stored in the memory and executable by the processor, wherein the program includes:
a stream distribution module configured to distribute a video stream;
a media content storage and retrieval module configured to store and retrieve media content associated with the video stream and a media offset time stamp of media content creation relative to a time of the associated video stream;
a content distribution module configured to retrieve the stored media content from the media content storage and retrieval module responsive to a media offset time of the video stream and distribute the media content;
a content receiver module configured to receive media content associated with the video content from a viewer and associate a media offset time stamp with the media content based on the relative media time of the video stream at the time the media content was created; and
a content analysis module configured to determine if received media content was created by a viewer who had not previously viewed the video stream; and
wherein the system is operative to:
distribute the video stream from the stream distribution module with at least a determination of whether the received media content was created by the viewer who had not previously viewed the video stream;
during a presentation of the video stream, receive at the content receiver module a first media content associated with the video stream generated by a viewer;
upon receipt of the first media content, determine using the content analysis module whether the first media content was created by a viewer who had not previously viewed the video stream;
upon determining that the received first media content was created by a viewer who had not previously viewed the video stream, store the received first media content with an associated media offset time stamp using the media content storage and retrieval module and distribute the received first media content using the content distribution module; and
upon determining that the received first media content was created by a viewer who had not previously viewed the video stream, at least until the video stream has ended:
bypass storing the second media content; and
bypass distributing the second media content.

11. The system of claim 10, wherein the content distribution module is configured to receive relative timing information from the stream distribution module.

12. The system of claim 10, wherein the content analysis module is configured to determine if the first media content was created by a viewer who had not previously viewed the video stream responsive to whether the viewer is located in a geographical location to which the video stream had not previously been distributed.

13. The system of claim 10, wherein:
the stream distribution module is a video-on-demand module; and
the content analysis module is configured to determine if the first media content was created by a viewer who had not previously viewed the video stream responsive to whether the viewer had not previously viewed the video stream through the stream distribution module.

14. The system of claim 10, wherein the content analysis module is configured to determine if the first media content was created by a viewer who had not previously viewed the video stream responsive to whether the viewer created any of the stored media content with a media offset time stamp greater than the media offset time stamp of the first media content.

15. The system of claim 10, wherein the distribution of the video stream and the distribution of the first media content are accomplished by different means.

16. The system of claim 10, wherein the distribution of the video stream and the distribution of the first media content are accomplished by the same means.

* * * * *